(12) United States Patent
Wildner

(10) Patent No.: US 6,666,194 B2
(45) Date of Patent: Dec. 23, 2003

(54) METHOD AND DEVICE FOR CONTROLLING A MECHANICAL SUPERCHARGER OF AN INTERNAL COMBUSTION ENGINE

(75) Inventor: Oliver Wildner, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/080,646

(22) Filed: Feb. 22, 2002

(65) Prior Publication Data

US 2002/0129604 A1 Sep. 19, 2002

(30) Foreign Application Priority Data

Feb. 22, 2001 (DE) .......................................... 101 08 478

(51) Int. Cl.[7] ................................................ F02B 33/00
(52) U.S. Cl. ..................................... 123/559.3; 123/561
(58) Field of Search .............................. 123/559.3, 561, 123/491; 60/605.1

(56) References Cited

U.S. PATENT DOCUMENTS

| 4,738,110 A | * | 4/1988 | Tateno ...................... 123/559.3 |
| 4,766,873 A | * | 8/1988 | Miyagi et al. ........... 123/559.3 |
| 4,996,966 A | * | 3/1991 | Hitomi et al. ........... 123/559.3 |
| 5,875,766 A | * | 3/1999 | Ozawa ....................... 123/561 |
| 6,058,916 A | * | 5/2000 | Ozawa ..................... 123/559.3 |

FOREIGN PATENT DOCUMENTS

| JP | 59007742 A | * | 1/1984 | ............ F02D/5/00 |
| JP | 62228625 A | * | 10/1987 | ........... F02B/37/04 |
| JP | 05272348 A | * | 10/1993 | ........... F02B/39/12 |

\* cited by examiner

Primary Examiner—Thomas Denion
Assistant Examiner—Thai-Ba Trieu
(74) Attorney, Agent, or Firm—Kenyon & Kenyon

(57) ABSTRACT

A method and a device for controlling a mechanical supercharger of a combustion engine, coupling a mechanical supercharger to the internal combustion engine during the starting phase, even before the appearance of the first fuel injections into the combustion engine.

6 Claims, 3 Drawing Sheets

METHOD AND DEVICE FOR CONTROLLING A MECHANICAL SUPERCHARGER OF AN INTERNAL COMBUSTION ENGINE

FIELD OF THE INVENTION

The present invention relates to a method and a device for controlling a mechanical supercharger, positioned in the intake tract of an internal combustion engine, which is coupled to a drive via a controllable clutch, switching the supercharger on and off being done by a control signal acting upon an actuator of the clutch.

BACKGROUND INFORMATION

A method and a device for controlling such a mechanical supercharger are known, for example, from the non-prepublished German Patent Application No. 1 00 39 081.1 filed on Aug. 10, 2000. The crankshaft of the internal combustion engine is here used as the drive for the mechanical supercharger, and it may be coupled by force locking to the supercharger via the controllable clutch. The clutch is opened or closed by a control signal which is ascertained in an electronic control unit as a function of operating conditions, especially as a function of the load of the internal combustion engine, and in this manner the mechanical supercharger is coupled to the drive or decoupled from the drive.

It has been shown that freezing up of the supercharger can occur, at least in response to certain supercharger arrangements under certain operating conditions. In this connection, the frozen-up supercharger can lead to considerable reduction in the flow cross section for the intake air, so that, in the extreme case, starting the combustion engine is no longer possible.

SUMMARY OF THE INVENTION

By switching on the supercharger when the combustion engine is started, particularly before beginning fuel injection, it is possible to break loose a frozen-up mechanical supercharger. In the extreme case, this also ensures the start of the combustion engine.

It is particularly advantageous that the breaking loose of the supercharger occurs even before the actual speed runup of the combustion engine, so that the driver cannot feel it happening.

It is also advantageous that the supercharger is broken loose even before the beginning of fuel injection, so that the subsequent start of the combustion engine always takes place under the same boundary conditions, and is thereby applicable.

A particularly preferred implementation is that, when a predefined engine speed is exceeded, which leads to the inference that the starter is being operated (for example, 150 revolutions per minute), closing of the clutch takes place for a predetermined time, while when it falls below this speed threshold, possibly with the addition of a hysteresis quantity, opening of the clutch takes place immediately. It is particularly advantageous that this takes place only at low temperatures.

This procedure demonstrates especially advantageous effects with mechanical superchargers which are installed in the flow direction after the throttle, and have no air bypass.

DETAILED DESCRIPTION

Figure 1:
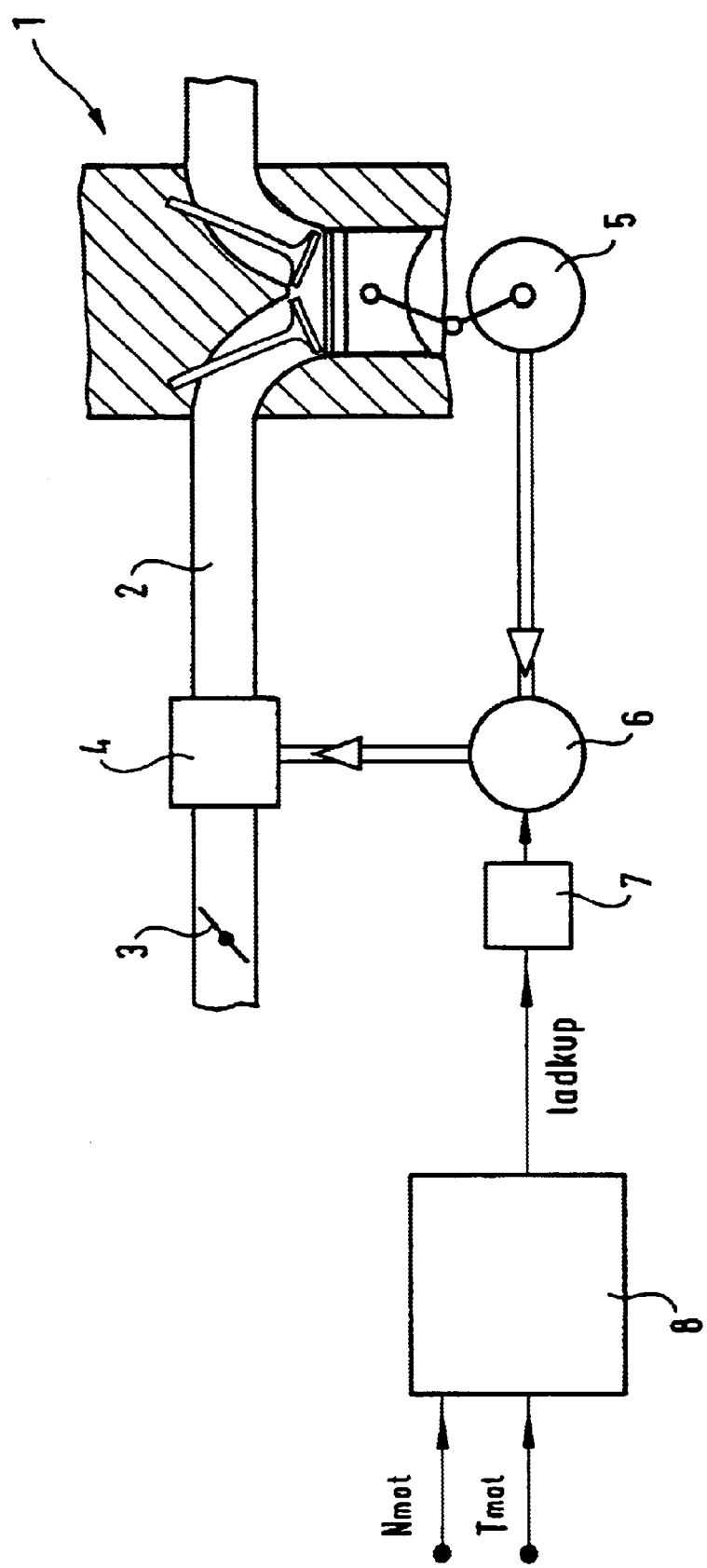
FIG. 1 shows a schematic illustration of an internal combustion engine outfitted with a controllable mechanical supercharger.

FIG. 1 represents an internal combustion engine 1, in whose intake tract 2 after throttle 3 a supercharger 4 is situated. This mechanical supercharger 4 is driven by crankshaft 5 of the internal combustion engine. For this purpose, mechanical supercharger 4 is connected by force-locking to crankshaft 5 via a clutch 6. Clutch 6 makes it possible to connect mechanical supercharger 4 to drive 5 or to disconnect it. For this, an actuator 7 for clutch 6 is provided, by which clutch 6 can be closed or opened. Actuator 7 is, for example, a hydraulic valve with which clutch 6 can be brought into a closed or open state. Instead of a hydraulic valve, however, an electromagnetic actuator can also be used. Actuator 7 receives a control signal ladkup from an electronic control unit 8. This contains several input signals from which it brings the control signal for actuator 7, as described, for example, in the related art. As a rule, the clutch is switched on as a function of the load (e.g. accelerator setting, driver command, torque, etc) of the internal combustion engine and/or its change, switching on of the supercharger and thus a power increase of the internal combustion engine taking place at high loads and/or high load changes.

In the exemplary embodiment in FIG. 1, only those input variables of control unit 8 are shown, which have any significance in breaking loose the supercharger, in connection with the procedure described below. They are engine speed Nmot and engine temperature Tmot. In other embodiments, instead of, or supplementary to engine temperature, other temperature variables are ascertained, such as intake air temperature, environmental air temperature, intake manifold temperature, etc. In addition, signals are supplied to control unit 8 which are necessary for controlling the supercharger as well as the engine itself, such as the accelerator position, the throttle blade position, the exhaust gas composition, etc.

It has been shown that, under certain operating conditions, freezing up of such mechanical superchargers may occur. In this case it is possible that the internal combustion engine can no longer be started, since the frozen-up supercharger prevents enough intake air from being supplied to the combustion engine. Therefore it is provided to have the frozen-up supercharger broken loose during the starting operation, even before the actual speed runup of the combustion engine, in order thereby to ensure the ability of the combustion engine to start under these operating conditions. As is described in detail below, the control signal for the supercharger clutch is read out for closing the supercharger clutch after the operation of the starter by the driver, so that the supercharger is briefly switched on during the starting operation and before the speed runup of the internal combustion engine. This brief switching on of the supercharger ensures that a frozen-up supercharger may be broken loose, and that the engine may be started even under unfavorable conditions. Thus the switching on of the supercharger by the respective control of its clutch takes place before the beginning of fuel injection into the internal combustion engine, so that a possibly frozen-up supercharger is broken loose.

Figure 2:
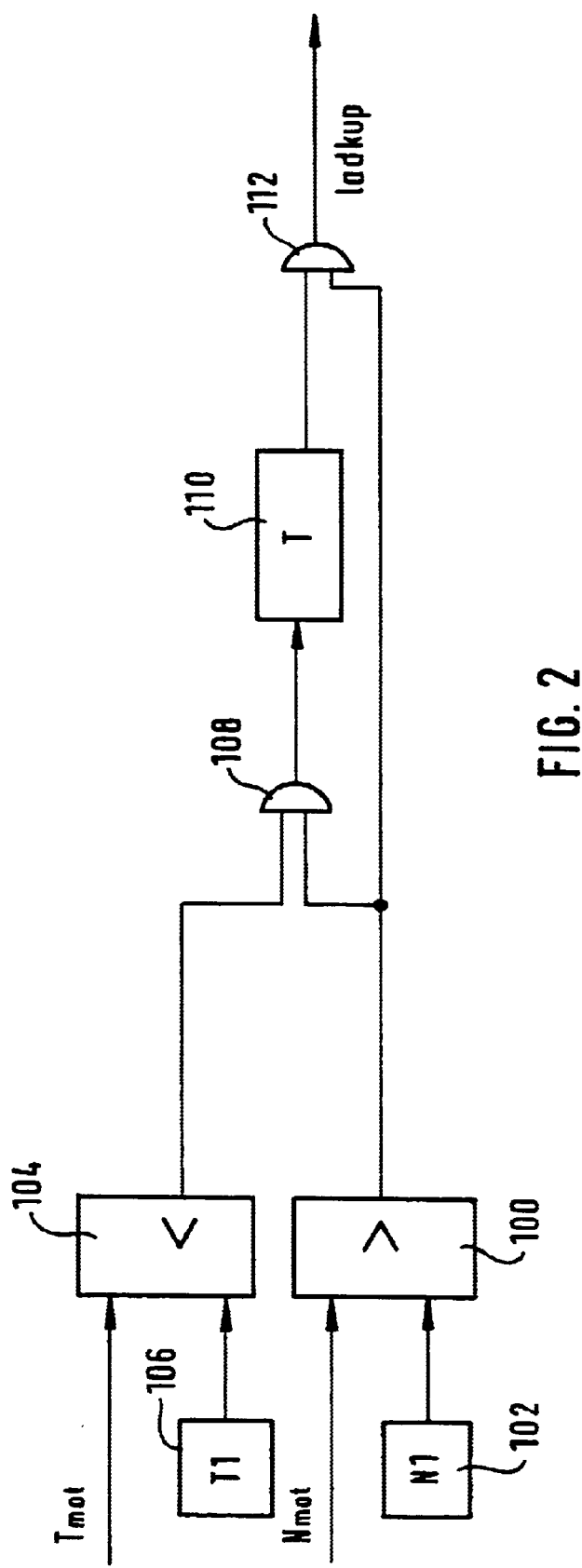
FIG. 2 a sequence diagram is sketched, which describes the procedure for controlling the supercharger clutch during the starting operation.

FIG. 2 shows a sequence diagram of a preferred embodiment of the switching on of the supercharger in the starting operation. Here, the sequence diagram sketches the program of a microcomputer contained in control unit 8, the individual blocks representing programs, program steps or program parts, while the connecting lines show the information stream.

In the preferred exemplary embodiment, engine temperature Tmot (preferably coolant temperature) and engine speed Nmot are read in. Engine speed Nmot is compared in a comparator 100 with a predetermined speed threshold value Nmotl stored in memory cell 102. This value Nmot 1, in this connection, is selected so that its being exceeded shows the beginning of a starting operation. In one exemplary embodiment it lies in the range of a few 10 (tens) to ca 150 rev/min. In general, it lies below the release speed of the starter. If engine speed Nmot exceeds this speed threshold, a corresponding signal is emitted on the output line of comparator 100. The speed threshold value is fixed in the application phase. When engine speed Nmot falls below speed threshold value Nmot1 again, the output signal of comparator 100 is canceled.

In the preferred exemplary embodiment a temperature threshold is also provided which may be omitted from other exemplary embodiments. In a comparator 104, engine temperature Tmot is compared with an engine temperature threshold value Tmot1, which is stored in memory cell 106. If the engine temperature falls below this threshold value, it is assumed that an operating situation is present in which a freezing up of the supercharger can occur. According to a preferred exemplary embodiment, temperature threshold Tmot1 is fixed at 0° C.

If the engine temperature falls below this speed threshold, a corresponding signal is emitted on the output line of comparator 104. The output signals of comparator 104 and 100 are conducted to an AND operation 108, which emits a signal when the speed threshold value has been exceeded and the temperature threshold value has been undershot. In this case, the output signal of AND operation 108 triggers a timing device 110 which generates an output signal for a predetermined time T, which may lie in the range of a few up to 100 milliseconds, and the latter output signal represents control signal ladkup for the supercharger clutch, via a further AND operation 112. The output signal of comparator 100 is also supplied to AND operation 112, so that control signal ladkup for the clutch is only emitted as long as the engine speed exceeds speed threshold Nmot1. If the engine speed falls below speed threshold Nmot1 again (break-off of start operation), the control signal for the supercharger clutch is canceled, and the clutch is immediately reopened.

In summary, it should be noted that an activating signal closing the supercharger clutch is emitted for a predetermined time duration T when the engine speed exceeds a speed threshold value Nmot1 and the engine temperature Tmot falls below a temperature threshold Tmotl, as long as the engine speed is greater than an engine speed threshold, which may be identical to threshold Nmot1 or is less than it.

Another exemplary embodiment does without the temperature condition, or it is ascertained on the basis of another temperature variable, such as intake air temperature, environmental air temperature or intake manifold temperature.

Instead of, or additionally to the engine speed comparison and to the time lapse of control period T as opening condition for the supercharger clutch, in other embodiments the clutch is opened by other conditions' being present, e.g. if the supercharger speed exceeds a predetermined threshold value, or if a first injection or a first combustion has been recognized, or if the intake manifold pressure has reached a threshold value.

Figure 3A:
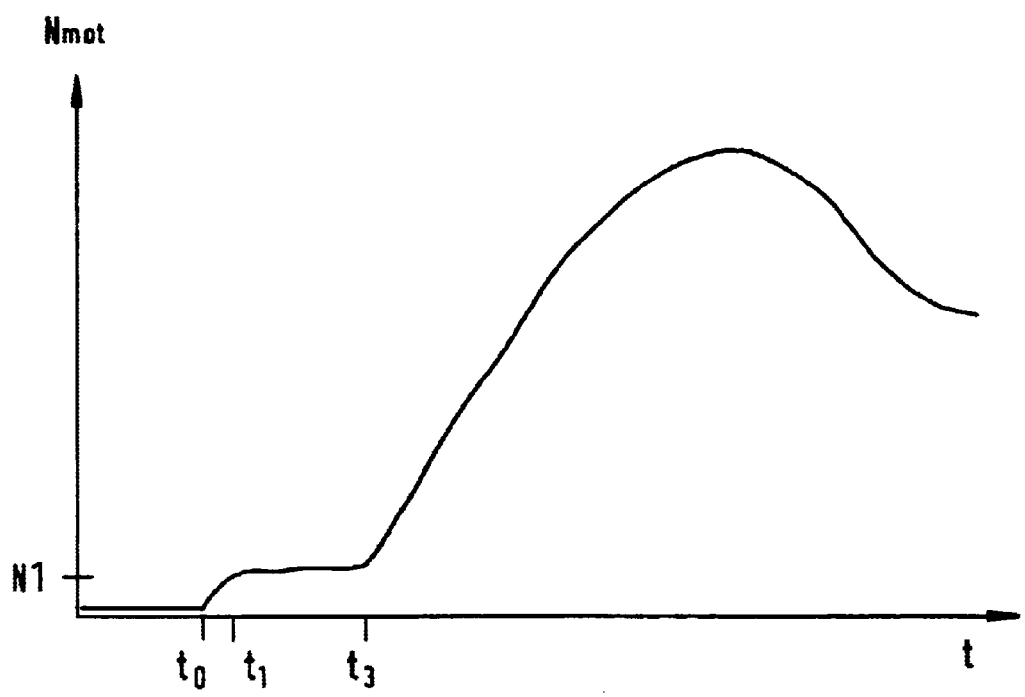
FIG. 3a shows a first time diagram pertaining to the present invention.
Figure 3B:
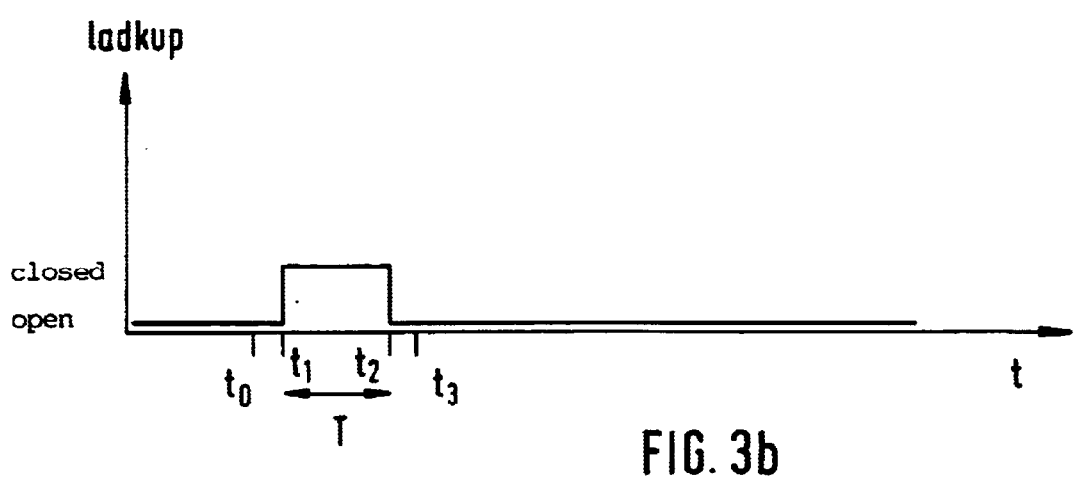
FIG. 3b shows a second time diagram pertaining to the present invention.

The preferred procedure described above is clarified in FIG. 3 in light of time diagrams. Here FIG. 3a shows the time plot of engine speed Nmot of the internal combustion engine, while FIG. 3b shows the time plot of control signal ladkup for the supercharger clutch. At time point t0 the driver turns the ignition key to the start position, so that by use of the starter (which may also be a starter-generator or the generator) the engine speed rises (cf FIG. 3a). The control signal for the supercharger clutch corresponds in this phase to the signal value assigned to the open clutch. At point t1 the combustion engine speed begins to exceed speed threshold value Nmot1. This leads to the closing of the clutch, since the control signal ladkup for the supercharger clutch is changed from the first to the second value, which is assigned to the closed clutch. For a predetermined time duration T, i.e. up to point t2, the clutch control signal remains at this value, and thus the clutch remains closed. Thereafter it is reset to the value assigned to the open clutch, which therefore reopens the clutch. At point t3, injections take place into the internal combustion engine, so that the normal starting speed pattern comes about. During this phase the supercharger clutch remains open.

Therefore, it should be noted that, in the starting process, closing of the supercharger clutch takes place, and thus a switching on of the supercharger, the switching on of the supercharging taking place before the appearance of the first fuel injections into the internal combustion engine.

What is claimed is:

1. A method for controlling a mechanical supercharger of an internal combustion engine, comprising:
   one of coupling the mechanical supercharger to and uncoupling the mechanical supercharger from the internal combustion engine in accordance with an activation by a setting element; and
   generating a control signal coupling the mechanical supercharger, the control signal leading to a coupling of the mechanical supercharger to the internal combustion engine during a starting phase, before an appearance of a first fuel injection into the internal combustion engine.

2. The method according to claim 1, further comprising:
   switching on the mechanical supercharger when an engine speed exceeds a speed threshold.

3. The method according to claim 1, further comprising:
   switching on the mechanical supercharger during the starting phase only if an engine temperature falls below a predefined temperature threshold value.

4. The method according to claim 1, wherein:
   the control signal is generated during a predetermined time duration.

5. The method according to claim 1, wherein:
   in response to an engine speed falling below an engine speed threshold, if the mechanical supercharger is coupled, an immediate decoupling of the mechanical supercharger will take place.

6. A device for controlling a mechanical supercharger of an internal combustion engine, comprising:
   a control unit for generating a control signal, the control signal one of coupling the mechanical supercharger to and decoupling the mechanical supercharger from an internal combustion engine, wherein:
   the control unit generates the control signal to couple the mechanical supercharger to the internal combustion engine during a starting phase, prior to an appearance of a first fuel injection into the internal combustion engine.

* * * * *